(12) United States Patent
Williams

(10) Patent No.: US 6,223,120 B1
(45) Date of Patent: Apr. 24, 2001

(54) CYLINDER TORQUE ESTIMATION USING CRANKSHAFT ANGULAR RESPONSE MEASUREMENTS

(76) Inventor: Jeremy Williams, 2860 Erie Ave., No. 1, Cincinnati, OH (US) 45208

(*) Notice: Subject to any disclaimer, the term of this patent is extended or adjusted under 35 U.S.C. 154(b) by 0 days.

(21) Appl. No.: 09/426,873

(22) Filed: Oct. 26, 1999

Related U.S. Application Data

(60) Provisional application No. 60/109,260, filed on Nov. 19, 1998.

(51) Int. Cl.[7] .............................. G06F 17/10; G06G 7/70

(52) U.S. Cl. ........................... 701/111; 701/115; 701/102

(58) Field of Search .................................. 73/116, 117.2, 73/117.3; 123/339.2, 436; 701/102, 103, 110, 111, 115

(56) References Cited

U.S. PATENT DOCUMENTS

| | | | |
|---|---|---|---|
| 4,532,592 | 7/1985 | Citron et al. | 701/105 |
| 4,697,561 | 10/1987 | Citron | 123/339.14 |
| 4,843,870 | 7/1989 | Citron et al. | 73/116 |
| 5,200,899 | 4/1993 | Ribbens et al. | 701/111 |
| 5,239,473 | 8/1993 | Ribbens et al. | 701/111 |
| 5,249,558 | * 10/1993 | Imamura | 123/339.2 |
| 5,269,271 | * 12/1993 | Kawai et al. | 123/339.2 |
| 5,278,760 | 1/1994 | Ribbens et al. | 701/111 |
| 5,377,537 | 1/1995 | James | 73/117.3 |
| 5,528,931 | 6/1996 | James et al. | 73/117.3 |
| 5,592,386 | 1/1997 | Gaultier | 701/99 |
| 5,646,340 | 7/1997 | Gee et al. | 73/116 |
| 5,771,482 | * 6/1998 | Rizzoni | 701/111 |
| 5,774,823 | 6/1998 | James et al. | 701/110 |
| 5,794,171 | * 8/1998 | Bryant et al. | 701/111 |
| 5,921,221 | * 7/1999 | Davis, Jr. et al. | 701/111 |

FOREIGN PATENT DOCUMENTS 60-8429   1/1985 (JP).

OTHER PUBLICATIONS

Ribbens, W.B., "A New Metric for Torque Nonuniformity", SAE Paper No. 830425, in SAE SP–540, *Electronic Engine/Drivetrain Control,* presented at SAE Intl Congress and Exposition, Detroit, MI. Feb. 28–Mar. 4, 1983, (pp. 35–40).

Mihelc, W.P, et al., "An On–Line Engine Roughness Measurement Technique", SAE Paper No. 840136, in SAE SP–567, *Sensors and Actuators,* presented at 1984 SAE Intl. Congress and Exposition, Detroit, MI, Feb. 27–Mar. 2, 1984, (pp. 9–18).

Sood, A.K., et al., "Engine Fault Analysis: Part I—Statistical Methods", *IEEE Transactions on Industrial Electronics,* vol. IE–32, No. 4, Nov. 1985, (pp. 294–300).

Sood, A.K. et al., "Engine Fault Analysis: Part II—Parameter Estimation Approach", *IEEE Transactions on Industrial Electronics,* vol. IE–32, No. 4,, Nov. 1985, (pp. 301–307).

(List continued on next page.)

*Primary Examiner*—Willis R. Wolfe
(74) *Attorney, Agent, or Firm*—Biebel & French

(57) ABSTRACT

A method and apparatus for identifying misfiring cylinders using crankshaft angular velocity measurements. The measured angular velocity is used in conjunction with a system model to estimate the indicated torque developed by each cylinder. The method and apparatus provides accurate results for engines with overlapping firing pulses, and also under conditions in which there is large torsional deflection in the crankshaft. The method and apparatus is suitable for implementation with on-board misfire diagnostics. Experimental validation is provided using a nineteen liter, six cylinder diesel engine. The experimental data demonstrates that accurate detection and identification of misfiring cylinders is possible over the full speed and load range of the engine.

33 Claims, 10 Drawing Sheets

OTHER PUBLICATIONS

Rezeka, S.F. et al., "A Diagnostic Technique for the Identification of Misfiring Cylinder(s)", SAE Paper No. 870546, presented at SAE Intl. Congress and Exposition, Detroit, MI, Feb. 23–27, 1987 (pp. 1–7).

Rizzoni, G., "A Passenger Vehicle OnBoard Computer System for Engine Fault Diagnosis, Performance Measurement and Control", in Proc. of 37th IEEE Vehicle Technology Conference, Tampa, FL, Jun. 1987, (pp. 450–457).

Rizzoni, G., "Fast Transforms for Rapid Isolation of Misfiring Cyclinders", SAE Paper No. 871915, presented at SAE Passenger Car Meeting and Exposition, Dearborn, MI, Oct. 19–22, 1987, (pp. 1–8).

Mueller, G. et al., "The Acceleration–Deceleration Test Technique for Conditioning Monitoring of Spark–Ignition Engines", SAE Paper No. 881326, presented at SAE Intl. Off–Highway & Powerplant Congress & Exposition, Milwaukee, WI, Sep. 12–15, 1988, (pp. 1–6).

Mauer, G.F. et al., "On–Line Cylinder Diagnostics on Combustion Engines by Noncontact Torque and Speed Measurements", SAE Paper No. 890485, in SAE SP–771, Sensors and Actuators 1989, presented at SAE Intl. Congress and Exposition, Detroit, MI, Feb. 27–Mar. 3, 1989, (pp. 123–130).

Citron, S.J. et al., "Cylinder by Cylinder Engine Pressure and Pressure Torque Waveform Determination Utilizing Speed Fluctuations", SAE Paper No. 890486, in SAE SP–771, Sensors and Actuators 1989, presented at SAE Intl. Congress and Exposition, Detroit, MI, Feb. 27–Mar. 3, 1989, (pp. 131–145).

Rizzoni, G., "Diagnosis of Individual Cylinder Misfires by Signature Analysis of Crankshaft Speed Fluctuations", SAE Paper No. 890884, presented at SAE Intl. Congress and Exposition, Detroit, MI, Feb. 27–Mar. 3, 1989, (pp. 1–10).

Ribbens, W.B. et al., "Applications of Precise Crankshaft Position Measurements for Engine Testing, Control and Diagnosis", SAE Paper No. 890885, in SAE SP–778, Automobile Audio Systems, presented at SAE Intl. Congress and Exposition, Detroit, MI, Feb. 27–Mar. 3, 1989, (pp. 151–165).

Rizzoni, G., "Estimate of Indicated Torque from Crankshaft Speed Fluctuations: A Model for the Dynamics of the IC Engine", in IEEE Tranactions on Vehehicle Technologies, vol. VT–38, No. 3, Aug. 1989, (pp. 168–179).

Mauer, G.F. et al., "A Method for Cylinder–Specific Engine Fault Diagnostics", Proc. of the 1st Intl. Machinery Monitoring & Diagnostics Conference, Las Vegas, NV, Sep. 1989, (pp. 728–734).

Plapp., G., et al., "Methods of On–Board Misfire Detection", SAE Paper No. 900232, 1990, (pp. 9–20).

Mauer, G.F., et al, "On–Line Detection of Vibration Damper Failure in Internal Combustion Engines", SAE Paper No. 900487, in SAE SP–805, Sensors and Actuators 1990, presented at SAE Intl. Congress and Exposition, Detroit, MI, Feb. 26–Mar. 2, 1990, (pp. 85–91).

Lida, et al., "IMEP Estimation from Instantaneous Crankshaft Torque Variation", SAE Paper No. 900617, presented at SAE Intl. Congress and Exposition, Detroit, MI, Feb. 26–Mar. 2, 1990, (pp. 1–12).

Mauer, G.F., "On–Line Cylinder Fault Diagnostics for Internal Combustion Engines", IEEE Transactions on Industrial Electronics, vol. 37, No. 3, Jun. 1990, (pp. 221–226).

Ribbens, W.B., et al., "Onboard Diagnosis of Engine Misfires", SAE Paper No. 901768, presented at SAE Passenger Car Meeting and Exposition, Dearborn, MI, Sep. 17–20, 1990 (pp. 1–10).

Mauer, G.F., "On–Line Determination of Available Torque in Internal Combustion Engines", SAE Paper No. 910855, in SAE P–242, Sensors and Actuators 1991, presented at SAE Intl. Congress and Exposition, Detroit, MI, Feb. 25–Mar. 1, 1991, (pp. 177–182).

Brown, T.S., et al., "Determination of Engine Cylinder Pressures from Crankshaft Speed Fluctuations", SAE Paper No. 920463, in SAE SP–895, Reducing Emissions form Diesel Combustion, presented at SAE Intl. Congress and Exposition, Detroit, MI, Feb. 24–28, 1992, (pp. 61–69).

Klenk, M., et al., "Misfire Detection by Evaluating Crankshaft Speed—A Means to Comply with OBDII", SAE Paper No. 930399, presented at SAE Intl. Congress and Exposition, Detroit, MI, Mar. 1–5, 1993, (pp. 1–10).

Taraza, D., "Estimation of the Mean Indicated Pressure from Measurements of the Crankshaft Angular Speed Variation", SAE Paper No. 932413, presented at SAE Intl. Off–Highway & Powerplant Congress & Exposition, Milwaukee, WI, Sep. 13–15, 1993, (pp. 1–11).

Taraza, D., "Possibilities to Reconstruct Indicator Diagrams by Analysis of the Angular Motion of the Crankshaft", SAE Paper No. 932414, presented at SAE Intl. Off–Highway & Powerplant Congress & Exposition, Milwaukee, WI, Sep. 13–15, 1993, (pp. 1–17).

Connolly, F.T., et al., "Modeling and Identification of the Combustion Pressure Process in Internal Combustion Engines: II—Experimental Results", Transactions of the ASME, Journal of Engineering for Gas Turbines and Power, vol. 115, Oct. 1993, (pp. 801–809).

Shiao, Y., et al., "Misfire Detection and Cylinder Pressure Reconstruction for SI Engines", SAE Paper No. 940144, in SAE SP–1029, Electronic Engine Controls 1994, presented at SAE Intl. Congress and Exposition, Feb. 28–Mar. 3, 1994, (pp. 13–22).

Lim, B., et al., "Estimation of the Cylinder Pressure in a SI Engine Using the Variation of Crankshaft Speed", SAE Paper No. 940145, in SAE SP–1029, Electronic Engine Controls 1994, presented at SAE Intl. Congress and Exposition, Detroit, MI, Feb. 28–Mar. 3, 1994, (pp. 23–32).

Ribbens, W.B., et al., "Road Tests of a Misfire Detection System", SAE Paper No. 940975, presented at SAE Intl. Congress and Exposition, Detroit, MI, Feb. 28–Mar. 3, 1994, (pp. 1–6).

Connolly, F.T., et al, "Modeling and Identification of the Combustion Pressure Process in Internal Combustion Engines", Mechanical Systems and Signal Processing, vol. 8(1), 1994, (pp. 1–19).

Williams, J., "An Overview of Misfiring Diagnostic Techniques Based on Crankshaft Angular Velocity Measurements", in SAE 960039, Electronic Engine Controls 1996 SP–1149, SAE International Congress and Exposition, Detroit, MI Feb. 26–29, 1996, (pp. 31–37).

* cited by examiner $$Tind_i = \alpha_i (IMEP) + \gamma_i$$

CYLINDER TORQUE ESTIMATION USING CRANKSHAFT ANGULAR RESPONSE MEASUREMENTS

CROSS-REFERENCE TO RELATED APPLICATION

This application claims the benefit of U.S. Provisional Application No. 60/109,260 filed Nov. 19, 1998, which is incorporated herein by reference.

BACKGROUND OF THE INVENTION

1. Field of the Invention

This invention relates to methods and apparatus for estimating cylinder torque in a system including a multi-cylinder engine and, more particularly, to a method and apparatus for estimating such cylinder torque based on system angular response measurements and a mathematical model of the system.

2. Description of the Prior Art

The estimation of cylinder torque in a multi-cylinder engine provides insight into the performance and health of each cylinder in the engine. Several related prior art methods have been developed for estimating cylinder torque based on system angular response measurements and a mathematical model of the system. A survey of such prior art methods is provided by Jeremy Williams in "An Overview of Misfiring Diagnostic Techniques Based on Crankshaft Angular Velocity Measurements", SAE 960039, in Electronic Engine Controls 1996 SP-1149, SAE International Congress and Exposition, Detroit, Mich., Feb. 26–29, 1996. incorporated herein by reference.

In essence, all of the related prior art methods have the following elements in common:

1. Develop a mathematical model representing the angular dynamics of the system;
2. Measure the angular response at one or more places in the system; and
3. Use the measured angular response and the mathematical model to calculate the system inputs.

U.S. Pat. No. 4,843,870 to Citron et. al., incorporated herein by reference, uses measured crankshaft angular velocity and a system model to calculate the indicated torque waveform applied by the engine cylinders. Although the Citron et al. patent teaches a reconstruction of engine torque from the measurement of angular velocity, it fails to recognize that the crankshaft is a rather flexible body under certain conditions, particularly in multi-cylinder engines operating at medium and high engine speeds. Since the system model does not allow for crankshaft torsional deflection, the method is limited by the conditions under which the rigid crankshaft assumption is valid.

U.S. Pat. No. 5,771,482 to Rizzoni, incorporated herein by reference, uses measured crankshaft angular velocity and a system model to calculate the indicated torque waveform applied by the engine cylinders. Rizzoni teaches a first method in which the crankshaft is modeled as two lumped inertias connected by a flexible element. However, this method does not fully model the dynamic torsional flexibility in the crankshaft. Since the system model does not allow for crankshaft torsional deflection between each crank throw, the method has limited use under conditions in which dynamic deflection in the crankshaft between each cylinder is significant.

In a second method, Rizzoni models the crankshaft as fully flexible, with a flexible element between each crankshaft throw. In engines in which the number of cylinders is greater than the number of angular response measurement locations, the number of unknown system inputs is greater than the number of known outputs. In such a case, Rizzoni teaches using a least squares, pseudo-inverse technique to solve for the unknown cylinder torque inputs at a single frequency. However, since the equation set relating the known outputs to the unknown inputs is rank deficient, the pseudo-inverse approach taught by Rizzoni does not accurately estimate the individual cylinder inputs.

SUMMARY OF THE INVENTION

The present invention relates generally to methods and forms of apparatus for estimating cylinder torque in multi-cylinder engines using the measured angular response of the system in combination with a mathematical model of the system dynamics. A fundamental challenge with all such methods is that the equation set relating the known angular responses to the unknown cylinder torque inputs is rank deficient as long as the number of unknown inputs is greater than the number of measured system responses.

The present invention provides a novel method and apparatus for cylinder torque estimation that offers significant advantages over the related prior art. Cylinder torque is parameterized as a function of at least one parameter for each cylinder. Angular response is measured at one or more places in the system to define at least one measured angular response. A set of frequency domain equations is developed relating the at least one measured angular response to the at least one parameter for each cylinder. At any selected analysis frequency, this equation set is under-determined, i.e. rank deficient.

A plurality of selected analysis frequencies are considered simultaneously, which results in a plurality of sets of frequency domain equations which are defined as over-determined. Each set of frequency domain equations relates the at least one measured angular response to the at least one parameter for each cylinder at the selected analysis frequency. These over-determined plurality of equation sets are solved simultaneously for the parameters for each cylinder using a least squares approach. The resulting parameters are used to estimate the torque contributed by each cylinder. In the specific case in which the chosen cylinder parameter is the indicated mean effective pressure (IMEP), the parameter is a direct measure of the torque contributed by each cylinder.

The method and apparatus of the present invention have been developed in a general form applicable to a wide variety of engines in a wide variety of applications. Analysis has shown that the method is valid for all engine types in general, and for four, six, and sixteen cylinder engines in particular. The analysis verifies that the method does not apparently place any restrictions on the maximum amount of crankshaft angular deflection between cylinders. Finally, the method and apparatus of the present invention have been built, tested, and experimentally verified using data taken on a heavy-duty six cylinder diesel engine. The experimental data shows that the new method is successful under a variety of conditions, particularly those in which there is large torsional deflection in the crankshaft. This experimental data further demonstrates that the present invention provides accurate estimation of cylinder torque under engine conditions in which prior art methods provide results of questionable accuracy.

Therefore, it is an object of the present invention to provide a method and apparatus for estimating with improved accuracy the torque produced by each of a plurality of cylinders in a reciprocating machine.

It is a further object of the present invention to provide such a method and apparatus which accounts for angular deflection between the plurality of cylinders.

It is another object of the present invention to provide such a method and apparatus for parameterizing the torque produced by each cylinder as a function of at least one parameter.

It is still yet another object of the present invention to provide such a method and apparatus for considering simultaneously a plurality of sets of frequency domain equations relating the measured angular response to the at least one parameter at a plurality of selected analysis frequencies.

Other objects and advantages of the invention will be apparent from the following description, the accompanying drawings and the appended claims.

DETAILED DESCRIPTION OF THE PREFERRED EMBODIMENT

Figure 1:
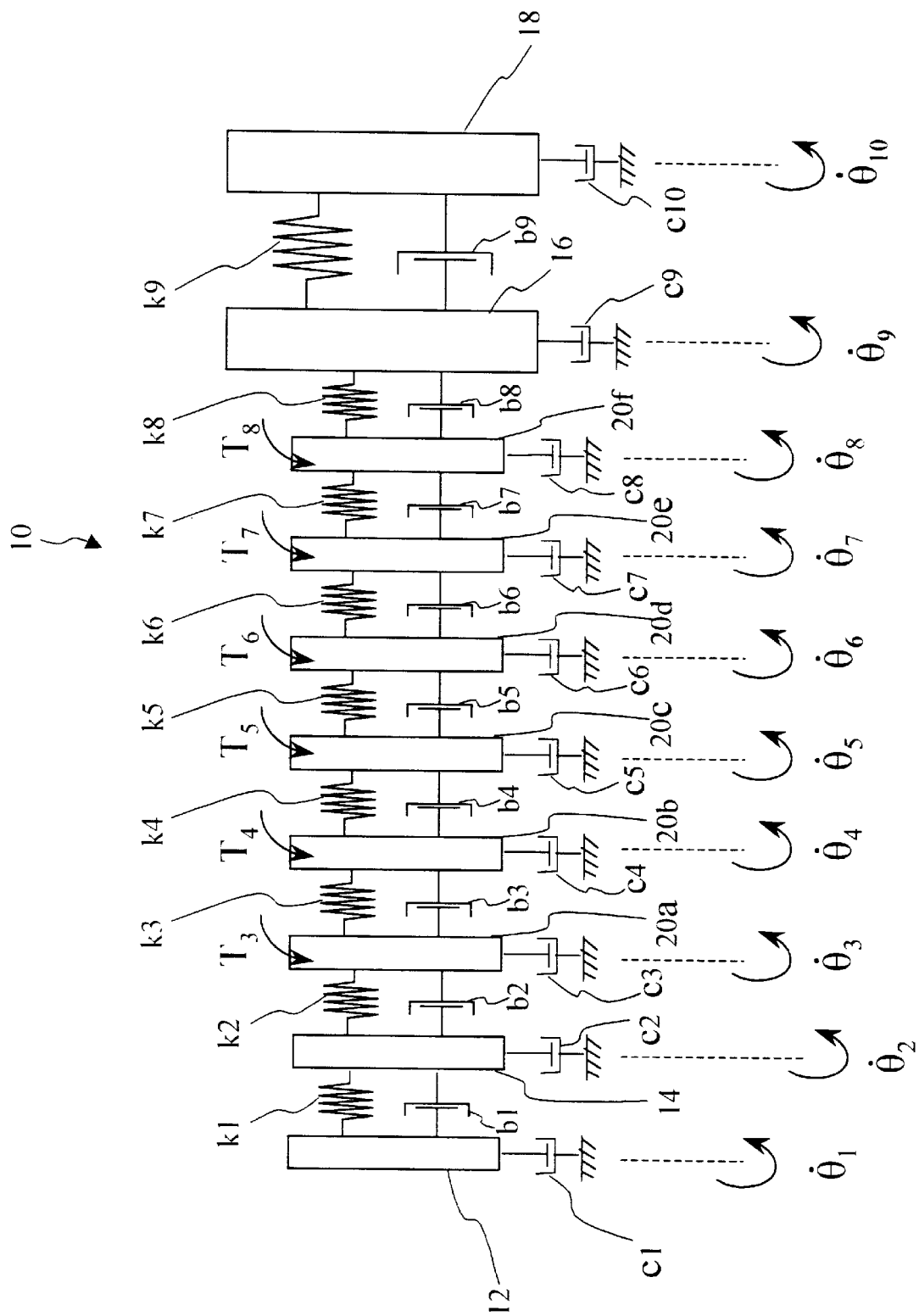
FIG. 1 is a schematic view of a lumped parameter model of an engine-drivetrain-load combination of a vehicle.

FIG. 1 illustrates schematically a lumped parameter model representing the torsional dynamics of a six cylinder engine-drivetrain system 10. This lumped parameter model is typical of models used to represent the torsional dynamics of engine and powertrain systems and is well-known to those of ordinary skill in the art. While the method and apparatus are described below with particular reference to a six cylinder engine-drivetrain system 10, it is to be understood that this in no way limits the scope of the present invention which may be easily adapted for use in connection with any system including a reciprocating machine having a plurality of cylinders.

Referring further to FIG. 1, a crankshaft damper inertia ring 12 is operably connected to a crankshaft nose 14. An engine flywheel 16 is positioned at the rear of the crankshaft, while reference numeral 18 represents the driven load for the system 10. The crankshaft inertia ring 12, crankshaft nose 14, engine flywheel 16, driven load 18 and crankshaft throws including engine cylinders 20a, 20b, 20c, 20d, 20e and 20f, define lumped masses, or nodes, in the model of FIG. 1. Torsional stiffness parameters k1, k2, k3, k4, k5, k6, k7, k8, and k9 join each of these lumped masses. The model further includes damping b1, b2, b3, b4, b5, b6, b7, b8, and b9 between the lumped masses and damping c1, c2, c3, c4, c5, c6, c7, c8, and c9 between each lumped mass and respective datum points.

Note that in the model of FIG. 1. there are six unknown cylinder torque inputs $T_3$, $T_4$, $T_5$, $T_6$, $T_7$ and $T_8$ and there are two known angular velocities $\dot{\theta}_2$ and $\dot{\theta}_9$. One angular velocity measurement $\dot{\theta}$ is usually made at each end of the engine crankshaft. More particularly, the crankshaft nose 14 and the flywheel 16 typically provide the locations for angular response measurements $\dot{\theta}_2$ and $\dot{\theta}_9$, respectively. The cylinder torque estimation method of the present invention uses the measured angular velocities $\dot{\theta}_2$ and $\dot{\theta}_9$ at each end of the crankshaft and the dynamic system model of FIG. 1 to estimate the unknown cylinder input torques $T_3$, $T_4$, $T_5$, $T_6$, $T_7$, and $T_8$ at each of the six engine cylinders 20a, 20b, 20c, 20d, 20e and 20f.

The dynamic system shown in FIG. 1 can be readily described with a set of ordinary differential equations. Under an assumption of steady state excitation at a single frequency ω, the differential equation set is transformed into an equivalent frequency domain equation set, represented as:

$$[H(\omega)]\{\dot{\theta}(\omega)\}=\{T(\omega)\} \quad (1)$$

where,

[H(ω)] is the nxn system FRF matrix $\{\dot{\theta}(\omega)\}$ is a nx1 vector of the node angular velocities $\{T(\omega)\}$ is a nx1 vector of excitation torques at each node n is the number of masses in the system model ω is the analysis frequency Note that while Equation 1 is written in terms of angular velocities $\dot{\theta}$, it could also be written in terms of other angular responses, including displacement θ or angular acceleration $\ddot{\theta}$. Conversion in the frequency domain between displacement θ, velocity $\dot{\theta}$ and acceleration $\ddot{\theta}$ is straightforward to those of ordinary skill in the art.

Since there are 10 lumped masses (n=10) in the system model shown in FIG. 1, there are ten independent equations in the equation set given by Equation 1. The system frequency response function (FRF) matrix, H, is a known function of the system parameters and the analysis frequency, ω. The angular velocity values $\dot{\theta}$ are known at the two measurement locations 14 and 16 and unknown at the other eight nodes 12, 18, 20a, 20b, 20c, 20d, 20e and 20f. The node excitation torques T are known to be zero at the nodes 12, 14, 16 and 18 and are unknown at each of the six nodes corresponding to the engine cylinders 20a, 20b, 20c, 20d, 20e and 20f. Thus, Equation 1 represents 10 equations with fourteen unknowns (eight unknown displacements plus six unknown cylinder excitation torques).

Since Equation 1 has ten equations and fourteen unknowns, the equation set is rank deficient. In general, the equation set will be rank deficient as long as the number of independent angular velocity measurements $\dot{\theta}$ is less than the number of unknown excitation torques T. In this example, the number of independent angular velocity measurements $\dot{\theta}$ is two, and the number of unknown cylinder torques T is six, which results in an equation set rank deficiency of four.

The rank deficiency of Equation 1 precludes accurate calculation of the unknown angular velocities $\dot{\theta}$ and cylinder excitation torques T. Note that Equation 1 is written and evaluated for a single frequency, $\omega$. By parameterizing cylinder torque T as a function of the indicated mean effective pressure (IMEP) for each cylinder and simultaneously considering multiple frequencies $\omega$, an equation set is developed relating the known angular velocity measurements $\dot{\theta}_2$ and $\dot{\theta}_9$ to the unknown angular velocities $\dot{\theta}_1, \dot{\theta}_3, \dot{\theta}_4, \dot{\theta}_5, \dot{\theta}_6, \dot{\theta}_7, \dot{\theta}_8$ and $\dot{\theta}_{10}$ and unknown cylinder torques $T_3, T_4, T_5, T_6, T_7$ and $T_8$ that is over-determined (i.e. the number of independent equations is greater than the number of unknowns). This enables the solution for the unknown parameters in a least squares sense using well-known pseudo-inverse techniques.

Each cylinder excitation torque T shown in FIG. 1 and Equation 1 is the total torque applied at the crankshaft throw. This torque T can be subdivided into three separate torques identified as the inertia torque, Tinr, the friction torque, Tfric, and the indicated torque, Tind as represented by the following equation:

$$T = Tinr + Tfric + Tind \qquad (2)$$

The inertia torque, Tinr, is the torque required to accelerate the equivalent reciprocating mass in each cylinder 20. The inertia torque waveform can be readily calculated using well known formulas relating the inertia torque Tinr to the engine speed, reciprocating mass per cylinder, and the engine slider crank parameters. Once the inertia torque waveform is calculated, a Discreet Fourier Transform (DFT) can be used to calculate the inertia torque Tinr as a function of frequency, $\omega$. Thus the cylinder inertia torque Tinr, in Equation 2 is easily calculated provided that the engine speed and basic engine geometry parameters are known. Such a procedure is disclosed in U.S. Pat. No. 4,843,870 to Citron et al., which is incorporated herein by reference. Once the inertia torque Tinr is calculated, the inertia torque Tinr is treated as a known quantity and is incoporated into the system equations as shown in Equation 4.

The friction torque, Tfric, is the torque required to overcome friction in the piston ring pack and other sources. Since this torque is predominantly zero frequency, or DC, in nature, the friction torque Tfric is not a significant excitation source in the frequency domain solution. For the purposes of the illustrative example, friction torque Tfric is ignored. The friction torque Tfric may, however, be included in the analysis by modeling the friction torque Tfric as a function of the engine speed and slider crank parameters and then including the calculated friction torque Tfric as a known torque applied to the system. Using this method, the friction torque Tfric is treated in a similar way that the inertia torque Tinr is applied to the system.

The indicated torque, Tind, is the torque applied by the cylinder 20 due to gas pressure forces on the piston. Tind is the key unknown determined by the cylinder torque estimation method of the present invention.

Figure 2:
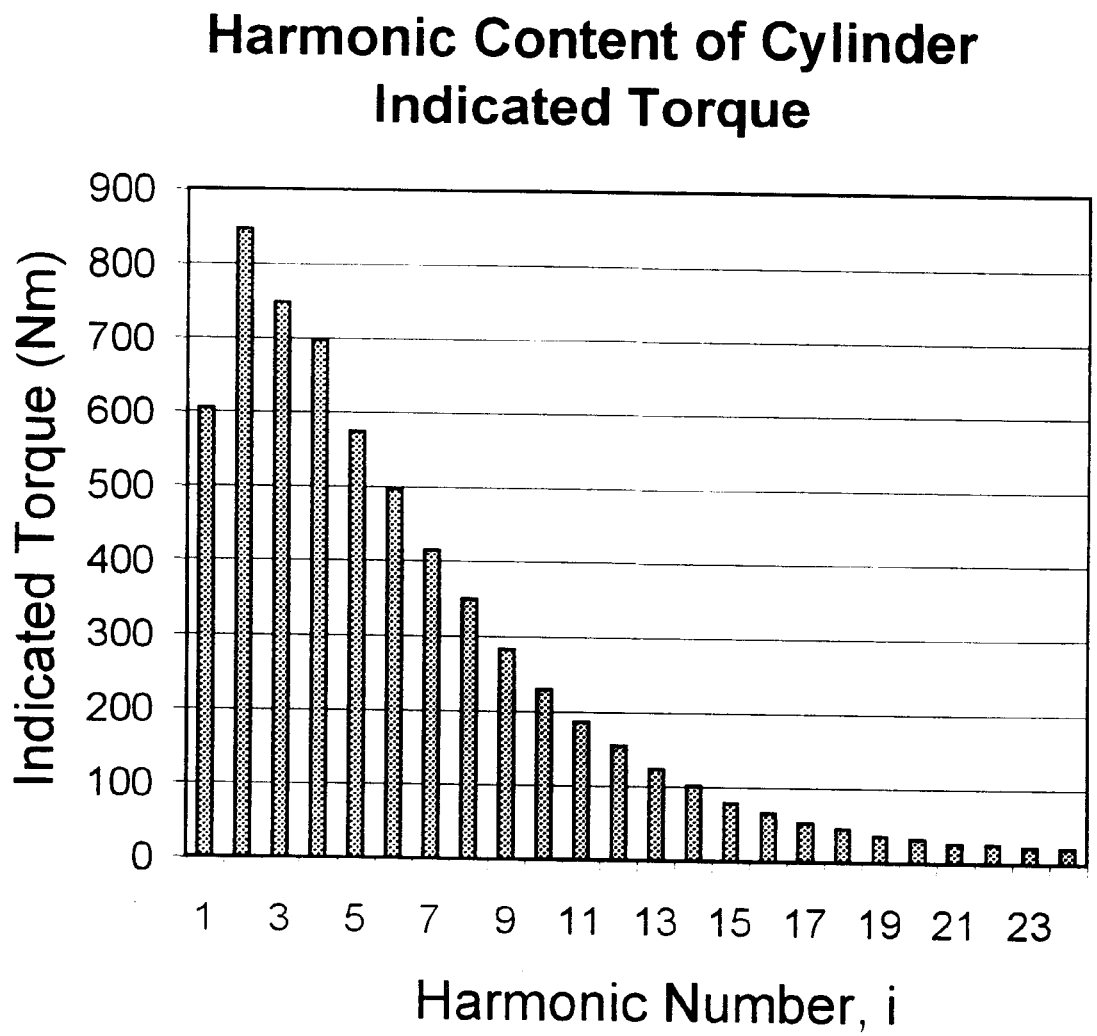
FIG. 2 is a graph illustrating the harmonic content of the cylinder indicated torque for a single cylinder.

Equation 1 is formulated in the frequency domain at a frequency, $\omega$. The motion of a four stroke combustion engine is periodic every two revolutions, so that the dynamic excitation and response of the engine occurs at multiples of half engine speed, or half orders. FIG. 2 illustrates the frequency content of a typical single cylinder 20 indicated excitation torque Tind as a function of frequency. The y-axis represents the magnitude of the torque in Nm (joules), and the x-axis represents the harmonic number.

For a four cycle engine, the first harmonic is 0.5 times engine speed, the second harmonic is 1 times engine speed, the third harmonic is 1.5 times engine speed, and so forth. FIG. 2 demonstrates that the frequency content of the indicated torque Tind is concentrated at discrete harmonics, and contains significant energy for approximately the first twenty-four harmonics of engine cycle speed (0.5 through 12th orders).

Since the dynamic forcing function for a four stroke engine occurs at the first 24 harmonics of cycle speed, the forced response of the system also occurs at these frequencies. Thus, the measured angular velocity signals $\dot{\theta}_2$ and $\dot{\theta}_9$ contain significant energy at multiple orders corresponding to a simultaneous forced excitation at multiple orders. The simultaneous excitation and response of multiple orders is used to develop additional equations to eliminate the rank deficiency of the overall plurality of equation sets.

Linear Parameterizaiton Embodiment

Figure 3:
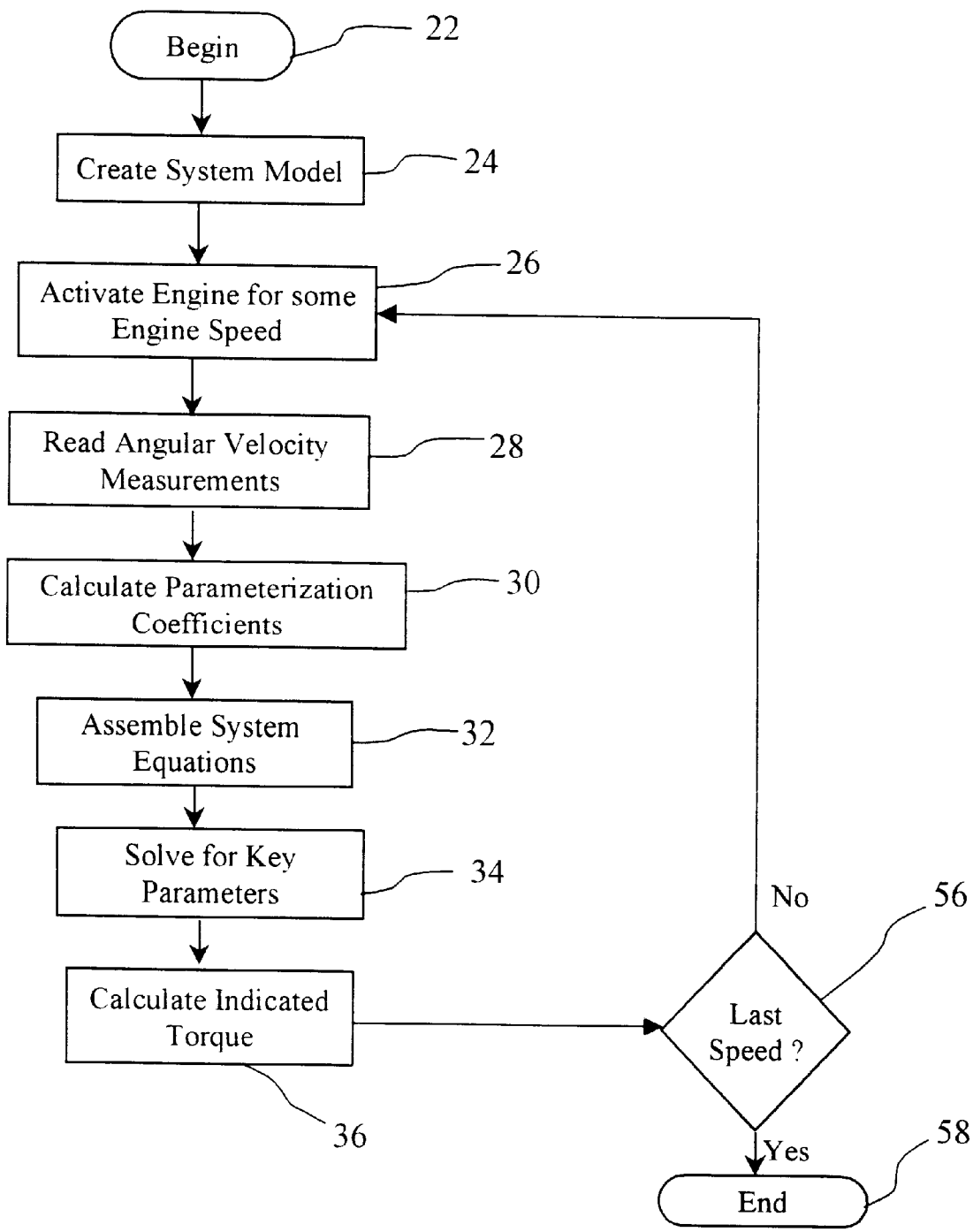
FIG. 3 is a flow chart illustrating a cylinder torque direct estimation process utilizing a linear relationship between the harmonics of the indicated torque and indicated mean effective pressure (IMEP)

Referring now to FIG. 3 the linear parameterization embodiment of the method of the present invention is illustrated in flow chart form. It should be appreciated that the present invention may utilize well-known computer software techniques to implement many of the process steps illustrated in FIG. 3. The method begins at block 22 and progresses to block 24 where the system model of FIG. 1 is created. The process of creating the system model is described in detail above. At block 26, the operator activates the engine to be evaluated such that the cylinders 20 cause an angular response $\dot{\theta}$ in the crankshaft and various nodes of the system model. Next, the angular velocity measurements $\dot{\theta}_2$ and $\dot{\theta}_9$ are measured at block 28. At block 30, the parameterization coefficients $\alpha$ and $\gamma$ are calculated.

Figure 4:
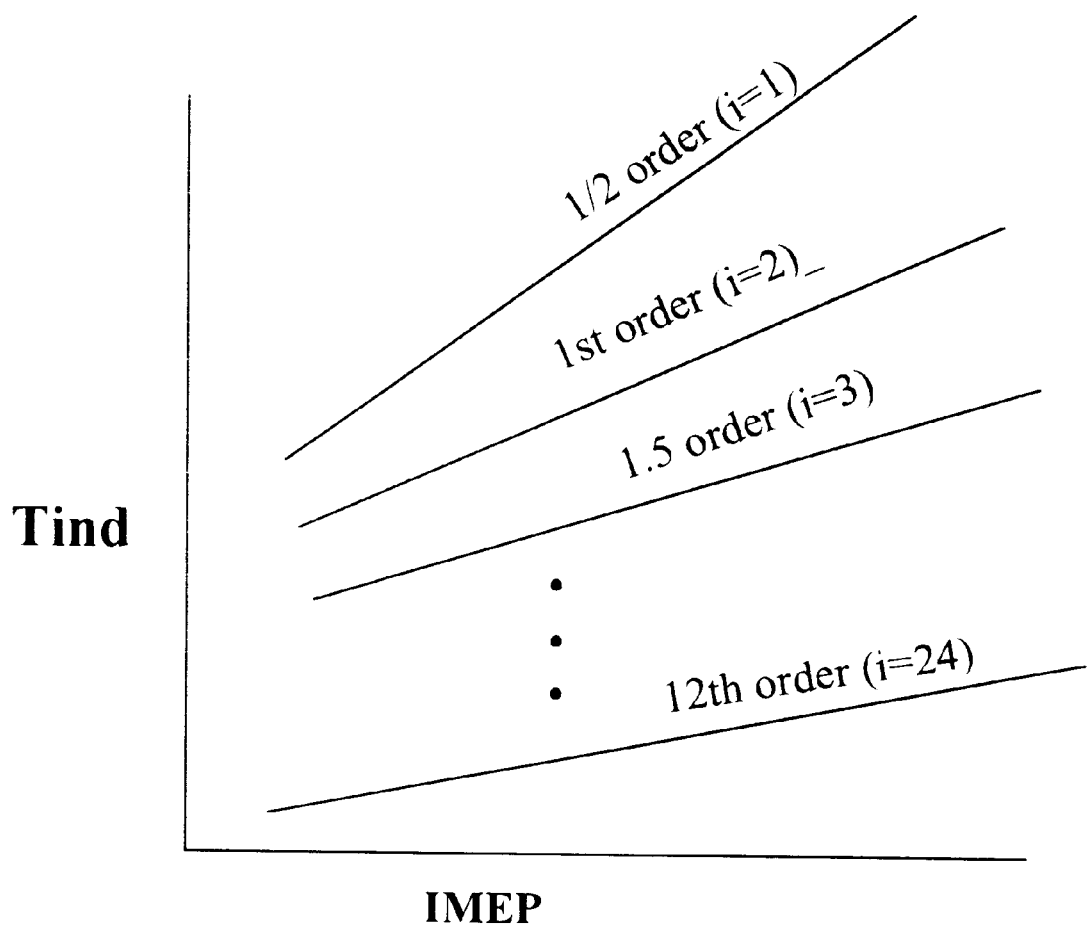
FIG. 4 is a graph illustrating the harmonic coefficients of the indicated torque for a cylinder modeled as linear functions of the cylinder indicated mean effective pressure (IMEP)

FIG. 4 demonstrates parameterization of the harmonics of the cylinder indicated torque, Tind, as a linear function of the cylinder indicated mean effective pressure (IMEP) for each harmonic, i. The parameterization is developed by applying a range of cylinder pressure curves (the cylinder pressure curves may be measured or simulated) corresponding to differing levels of IMEP to a model of the slider crank mechanism for the engine, and then calculating the harmonics of the resulting indicated torque Tind. If the indicated torque Tind is scaled by an appropriate factor, such as by dividing the indicated torque Tind by the engine bore and stroke dimensions, the same parameterization scheme may be used for several different engines. This parameterization scheme is a method that is well known among those skilled in the art of engine torsional vibration analysis.

Using the parameterization scheme shown in FIG. 4, the cylinder indicated torque, Tind, at the ith harmonic and the jth cylinder is expressed as a function of the IMEP value for each cylinder.

$$Tind_{y} = \alpha_i(IMEP_j) + \gamma_i \qquad (3)$$

In Equation 3, the parameterization coefficients $\alpha$ and $\gamma$, and the value Tind are complex values and the IMEP values are real. The coefficients $\alpha$ and $\gamma$ are determined from the parameterization scheme shown in FIG. 4. That is, for a given IMEP value, Equation 3 can be used to calculate the cylinder indicated torque, Tind, for all of the significant harmonics as illustrated in FIGS. 2 and 4. More particularly and with further reference to FIG. 4, the coefficient α is the slope of the line for the ith harmonic, and the coefficient γ is the y-intercept of the line for the ith harmonic.

Note that while the parameterization scheme shown in FIG. 4 represents the indicated torque Tind as a linear function of the IMEP, such a relationship is not necessary. If the indicated torque Tind is parameterized using non-linear curves, the curves can be locally linearized around an initial estimate for the IMEP, and the equations can then be solved in an iterative solution process, relinearizing the parameterization curves after each update of the IMEP estimate for each cylinder. For clarity, in the present embodiment the parameterization is assumed to be linear. Complete treatment of the non-linear embodiment is described below with reference to FIGS. 5 and 6.

Equation 1 is a frequency domain equation set relating the measured angular velocity $\dot{\theta}_2$ and $\dot{\theta}_9$ to the unknown torques $T_3$, $T_4$, $T_5$, $T_6$, $T_7$ and $T_8$ applied at each cylinder 20a, 20b, 20c, 20d, 20e and 20f. Equation 2 represents each unknown cylinder torque T as a known inertia torque Tinr plus an assumed known friction torque, Tfric, plus an unknown indicated torque Tind. Equation 3 parameterizes the indicated torque Tind as a linear function of the IMEP for each cylinder 20. Equation 1, 2, and 3 are now combined into a single frequency domain equation set. Equation 4, which relates the measured angular velocity $\dot{\theta}_2$ and $\dot{\theta}_9$ to the IMEP values for each cylinder 20 at a single analysis frequency ω. This step of assembling the system equations is represented by block 32 in FIG. 3.

$$[H]\{\theta\}=\{T\} \qquad (4)$$

where, $$[H] = \begin{bmatrix} H_{1,1} & \cdots & H_{10,1} \\ \vdots & \ddots & \vdots \\ H_{10,1} & \cdots & H_{10,10} \end{bmatrix}$$

$$\{\theta'\} = \begin{Bmatrix} \dot{\theta}_1 \\ \vdots \\ \dot{\theta}_{10} \end{Bmatrix}$$

$$\{T\} = \begin{Bmatrix} 0 \\ 0 \\ Tinr_{i1} + \alpha_i(IMEP_1) + \gamma_i \\ Tinr_{i2} + \alpha_i(IMEP_2) + \gamma_i \\ Tinr_{i3} + \alpha_i(IMEP_3) + \gamma_i \\ Tinr_{i4} + \alpha_i(IMEP_4) + \gamma_i \\ Tinr_{i5} + \alpha_i(IMEP_5) + \gamma_i \\ Tinr_{i6} + \alpha_i(IMEP_6) + \gamma_i \\ 0 \\ 0 \end{Bmatrix}$$

Note that the number of independent equations in Equation 4 remains equal to ten, and the number of unknowns remains equal to fourteen. More particularly, there are eight unknown angular velocities, and six unknown IMEP values consisting of one unknown IMEP value for each of the six cylinders 20.

Now consider solving the system of equations using two frequencies, $\omega_1$ and $\omega_2$, simultaneously. This is possible since the applied torque T and resulting angular response $\dot{\theta}$ contain significant energy at several harmonics. The resulting plurality of sets of frequency domain equations are represented below as Equation 5.

$$\begin{bmatrix} H(\omega_1) & 0 \\ 0 & H(\omega_2) \end{bmatrix} \begin{Bmatrix} \theta(\omega_1) \\ \theta(\omega_2) \end{Bmatrix} = \begin{Bmatrix} T(\omega_1) \\ T(\omega_2) \end{Bmatrix} \qquad (5)$$

where, $$[H(\omega_1)] = \begin{bmatrix} H(\omega_1)_{1,1} & \cdots & H(\omega_1)_{10,1} \\ \vdots & \ddots & \vdots \\ H(\omega_1)_{10,1} & \cdots & H(\omega_1)_{10,10} \end{bmatrix}$$

$$[H(\omega_2)] = \begin{bmatrix} H(\omega_2)_{1,1} & \cdots & H(\omega_2)_{10,1} \\ \vdots & \ddots & \vdots \\ H(\omega_2)_{10,1} & \cdots & H(\omega_2)_{10,10} \end{bmatrix}$$

$$\{\theta(\omega_1)\} = \begin{Bmatrix} \dot{\theta}(\omega_1)_1 \\ \vdots \\ \dot{\theta}(\omega_1)_{10} \end{Bmatrix}, \{\theta(\omega_2)\} = \begin{Bmatrix} \dot{\theta}(\omega_2)_1 \\ \vdots \\ \dot{\theta}(\omega_2)_{10} \end{Bmatrix}$$

$$\{T(\omega_1)\} = \begin{Bmatrix} 0 \\ 0 \\ Tinr(\omega_1)_1 + \alpha_{\omega_1}(IMEP_1) + \gamma_{\omega_1} \\ Tinr(\omega_1)_2 + \alpha_{\omega_1}(IMEP_2) + \gamma_{\omega_1} \\ Tinr(\omega_1)_3 + \alpha_{\omega_1}(IMEP_3) + \gamma_{\omega_1} \\ Tinr(\omega_1)_4 + \alpha_{\omega_1}(IMEP_4) + \gamma_{\omega_1} \\ Tinr(\omega_1)_5 + \alpha_{\omega_1}(IMEP_5) + \gamma_{\omega_1} \\ Tinr(\omega_1)_6 + \alpha_{\omega_1}(IMEP_6) + \gamma_{\omega_1} \\ 0 \\ 0 \end{Bmatrix}$$

$$\{T(\omega_2)\} = \begin{Bmatrix} 0 \\ 0 \\ Tinr(\omega_2)_1 + \alpha_{\omega_2}(IMEP_1) + \gamma_{\omega_2} \\ Tinr(\omega_2)_2 + \alpha_{\omega_2}(IMEP_2) + \gamma_{\omega_2} \\ Tinr(\omega_2)_3 + \alpha_{\omega_2}(IMEP_3) + \gamma_{\omega_2} \\ Tinr(\omega_2)_4 + \alpha_{\omega_2}(IMEP_4) + \gamma_{\omega_2} \\ Tinr(\omega_2)_5 + \alpha_{\omega_2}(IMEP_5) + \gamma_{\omega_2} \\ Tinr(\omega_2)_6 + \alpha_{\omega_2}(IMEP_6) + \gamma_{\omega_2} \\ 0 \\ 0 \end{Bmatrix}$$

In Equation 5, the FRF matrices, H, are known. The angular velocities $\dot{\theta}$ are known at the measurement locations 14 and 16 and unknown at the other nodes 12, 18, 20a, 20b, 20c, 20d, 20e and 20f. The inertia torques, Tinr, applied at the cylinders 20 are known. The coefficients, α and γ, are known. Equation set 5 therefore results in 20 independent equations and 22 unknowns. The unknown quantities are the unknown angular velocities at 8 nodes for each of the two frequencies $\omega_1$ and $\omega_2$ and the 6 unknown IMEP values, $IMEP_1$ through $IMEP_6$. Equation 5 has a rank deficiency of two.

Equation 4, which considers only a single analysis frequency $\omega_1$, has a rank deficiency of four. Equation 5, which considers two analysis frequencies $\omega_1$ and $\omega_2$ simultaneously, has a rank deficiency of two. Simultaneous consideration of multiple selected analysis frequencies ω has reduced the rank deficiency of the equation set from four to two.

More frequencies ω can be added to the equation set in the manner illustrated in Equation 5. As the number of frequencies ω is increased, the rank deficiency of the solution is reduced. Consideration of one frequency ω yields ten equations and fourteen unknowns. Consideration of two frequencies ω yields twenty equations and twenty-two unknowns. Consideration of three frequencies ω yields thirty equations and thirty unknowns. Consideration of four frequencies ω yields fourty equations and thirty-eight unknowns. Consideration of more than four frequencies ω continues to make the equation set more over-determined.

Consideration of the three frequencies $\omega_1$ and $\omega_2$ and $\omega_3$ yields a strictly determined plurality of equation sets. In theory, these equation sets can be solved for the unknowns. In practice this is not practical, however, because the stiffness of the plurality of equation sets makes the solution excessively sensitive to measurement and other noise.

Consideration of four or more frequencies ω results in more independent equations than unknowns. These over-determined plurality of equation sets can be solved in a least squares sense to minimize error in the analysis. Once the angular velocities $\dot\theta$ have been measured and the equation set relating the measured data to the unknown angular velocities and unknown IMEP values is created, the over-determined plurality of equation sets may be solved as indicated by block 34 in FIG. 3. The parameters may by solved using any of several methods familiar to persons familiar with well known linear algebra methods.

For the purposes of this illustrative example, the plurality of equation sets will be solved by grouping all the unknowns to the left side of the equation, converting the complex equations to an equivalent set of real equations, eliminating the known imaginary portions of the IMEP as unknowns, and then solving for the unknown values using a least squares, pseudo-inverse technique. Equation 6 shows the over-determined plurality of equation sets with all the unknowns grouped on the left hand side of the equations.

$$[K]\{X\}=\{B\} \quad (6)$$

where,

[K]=Equivalent Stiffness Matrix
{X}=Vector of unknown angular velocities and IMEP values
{B}=Equivalent forcing vector Equation 6 is a set of complex equations, which are now converted into an equivalent set of twice as many real equations.

$$\begin{bmatrix} Kreal & -Kimag \\ Kimag & Kreal \end{bmatrix} \begin{Bmatrix} Xreal \\ Ximag \end{Bmatrix} = \begin{Bmatrix} Breal \\ Bimag \end{Bmatrix} \quad (7)$$

Considering the six cylinder engine illustrated in FIG. 1, and using two frequencies $\omega_1$ and $\omega_2$ in the analysis. Equation 6 contains twenty independent complex equations and twenty-two complex unknowns. The 20 complex equations become forty real equations with forty-four real unknowns after conversion to the form shown in Equation 7.

The unknowns vector, X, in Equations 6 and 7 consists of the unknown angular velocities $\dot\theta$ and the unknown IMEP values for each cylinder. In Equation 6, the unknowns are complex. In Equation 7, the real and imaginary parts of the unknowns are separate unknowns. The IMEP values are real constants, so that the imaginary part of each IMEP value is known to be zero. Since the imaginary part of the IMEP values are known, they can be eliminated from the unknowns vector, Ximag, in Equation 7. This reduces the number of unknowns in Equation 7, and increases the rank of the plurality of equation sets.

Again considering the six cylinder engine shown in FIG. 1, and using two frequencies $\omega_1$ and $\omega_2$ in the analysis, after eliminating the imaginary part of the IMEP values as unknowns. Equation 7 reduces to a system of forty real equations and thirty-two unknowns. By converting the complex system equations to an equivalent set of real equations, and eliminating the imaginary part of the IMEP values of unknowns, the number of unknowns has been further reduced and an over-determined plurality of equation sets are formulated. The number of frequencies ω required to formulate an over-determined plurality of equation sets in any given application is a function of several variables. Criteria for calculating the required number of frequencies ω for this task is described in greater detail below.

Once an over-determined plurality of equation sets have been established, the equations can be solved for the unknowns using a least squares, pseudo-inverse approach as shown by Equation 8.

$$\{\hat{X}\}=[K]^+\{B\} \quad (8)$$

where, $$[K][K]^+[K]=[K]$$

The calculated solution vector, $\hat{X}$, contains estimates for the real and imaginary parts of the unmeasured angular velocities $\dot\theta$, as well as estimates for the IMEP for each cylinder 20. As illustrated by block 36 in FIG. 3, the estimated IMEP values can be used directly as an estimate of the cylinder indicated torques Tind. Alternatively, the IMEP values can be used to indirectly estimate the cylinder torque T by converting the IMEP values to cylinder mean indicated torques. Tmean ind, as shown by Equation 9.

$$T\text{mean ind}=IMEP*V/4\pi \quad (9)$$

where,

V=swept volume of cylinder

The preceding example has shown how two angular velocity measurements $\dot\theta_2$ and $\dot\theta_9$ and a dynamic system model can be used to estimate the cylinder torque T in each cylinder 20 of a six cylinder engine. The method works without placing any restriction on maximum torsional deflection between cylinders 20.

Non-Linear Torque Parameterization Embodiment

The preceding embodiment parameterizes the cylinder indicated torque Tind as a linear function of the cylinder IMEP. Using this linear relationship, the coefficients, α and γ, correspond to the slope and y-intercepts of the lines shown in FIG. 4. In such a case, α and γ, are a function of the harmonic number only (Equation 3). Since the equations relating the indicated torque Tind to the IMEP for each harmonic are linear, they can be directly integrated into the linear equation set relating the measured angular velocities $\dot\theta_2$ and $\dot\theta_9$ to the unknown IMEP values.

Figure 5:
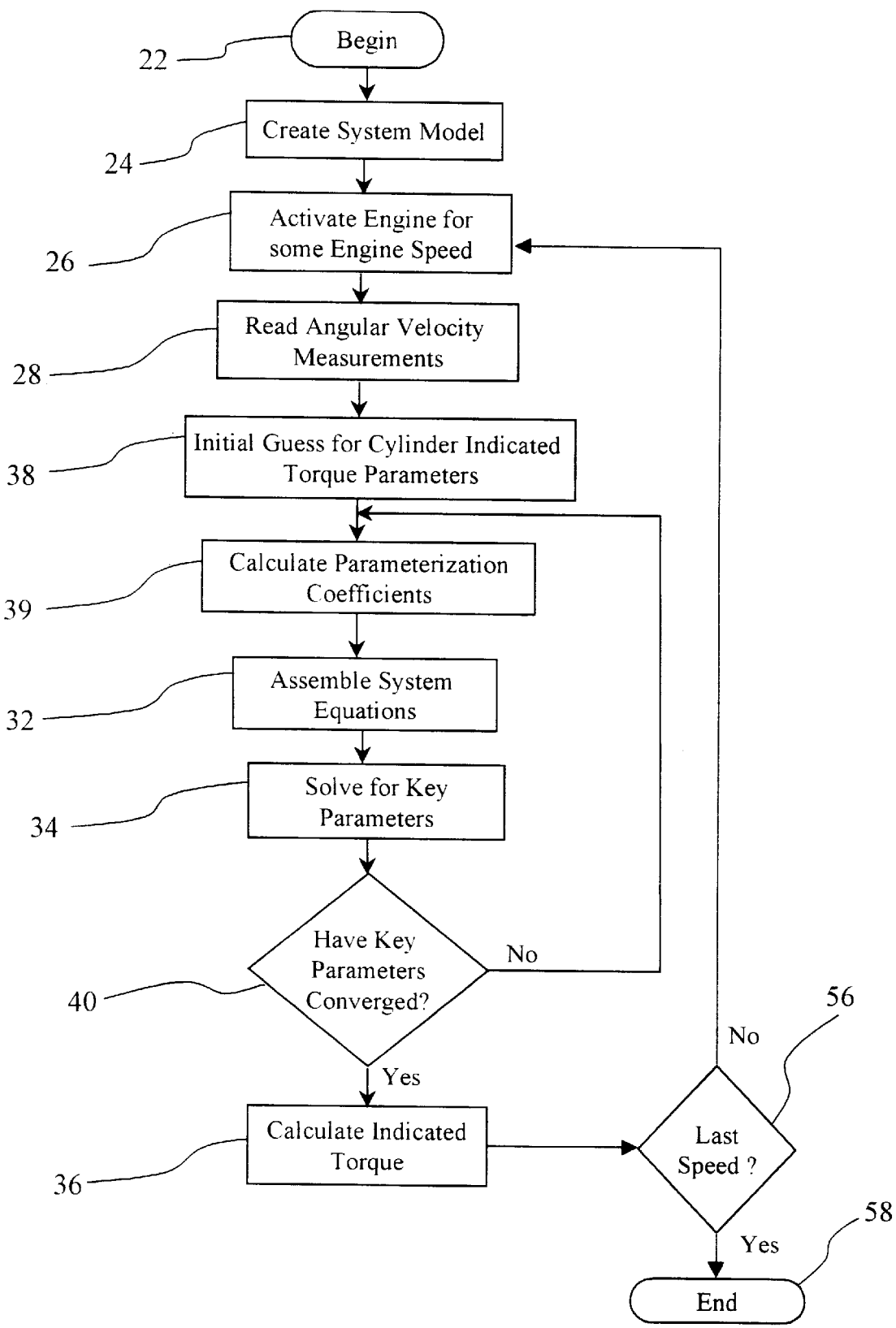
FIG. 5 is a flow chart illustrating a cylinder torque iterative estimation process utilizing a non-linear relationship between the harmonics of the indicated torque and indicated mean effective pressure (IMEP)
Figure 6:
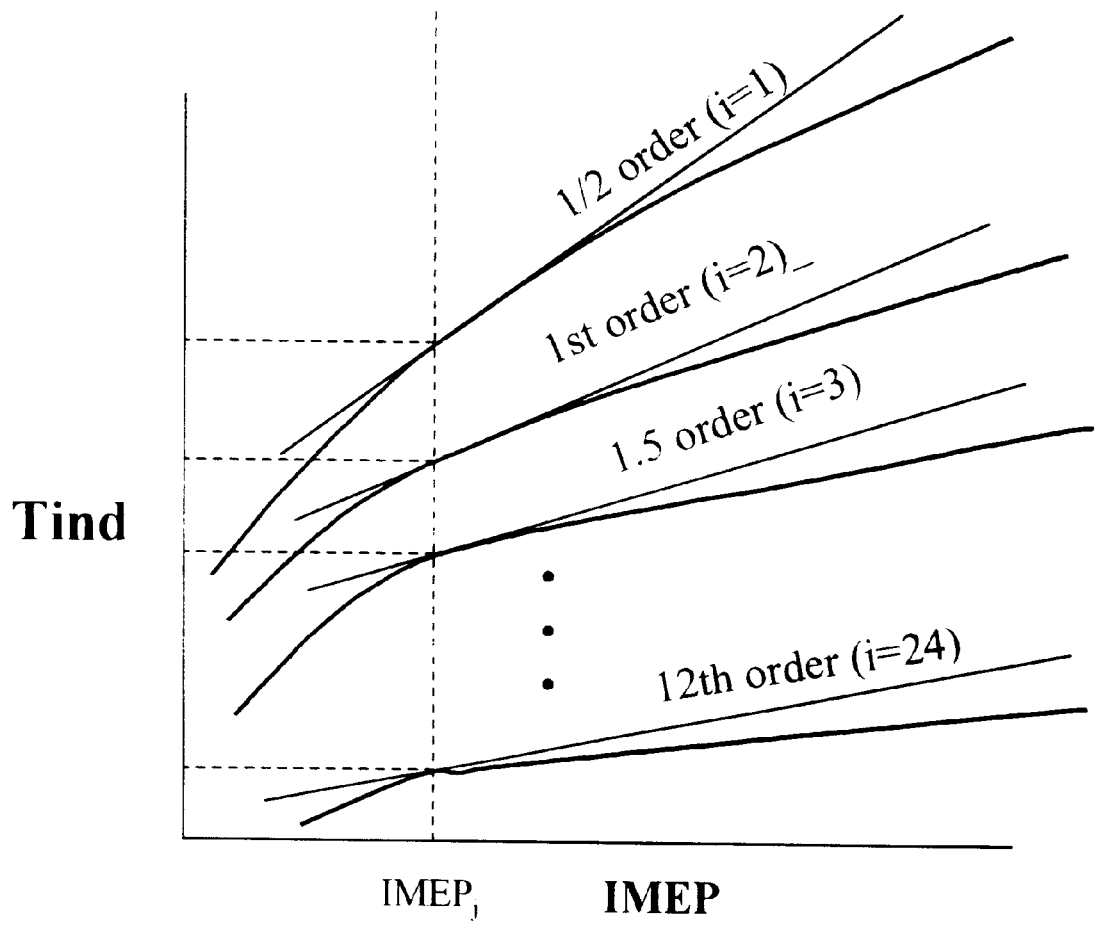
FIG. 6 is a graph illustrating the harmonic coefficients of the indicated torque for a cylinder modeled as non-linear functions of the cylinder indicated mean effective pressure (IMEP), and linearized around a local value of the IMEP.

The method of the present invention can easily be modified to include the general embodiment in which the harmonics of the indicated torque Tind are modeled as a non-linear function of IMEP. Such a non-linear parameterization embodiment of the present invention is illustrated in FIGS. 5 and 6. With further reference to FIG. 5, like steps to the linear torque parameterization embodiment of FIG. 3 are represented with like reference numerals. As such, the steps represented by blocks 22, 24, 26, 28, 32, 34 and 36 are the same for both the linear and non-linear toque parameterization embodiments.

In the non-linear torque parameterization embodiment of FIGS. 5 and 6, the harmonics of the cylinder indicated torque Tind are locally linearized around an initial guess for the IMEP for each cylinder 20. The initial guess for the IMEP for each cylinder is represented by block 38 in FIG. 5. The parameterization coefficients, $\alpha$ and $\gamma$, are then calculated in block 39 by locally linearizing the indicated torque Tind around the current value for the IMEP for each cylinder as shown in FIG. 6.

The resulting parameterization equations are then used in block 32 to assemble the plurality of frequency equation sets relating the measured angular velocity $\dot\theta_2$ and $\dot\theta_9$ to the IMEP value in the manner detailed above. At block 34, the frequency equations are solved for the IMEP values. The solutions for the IMEP values are compared at decision block 40 to determine if the updated IMEP values have converged to a stable solution. If the IMEP values have not converged then the updated values for the IMEP are used to re-linearize the indicated torque-IMEP relationship for each cylinder 20 around the updated values for IMEP, and the solution process is repeated beginning at block 39. This iterative solution process is continued until the updated IMEP values converge to a stable solution at block 36 where the indicated torque Tind is calculated.

Note that using this iterative procedure, the coefficients, $\alpha$ and $\gamma$, become a function of both the harmonic number, i, and the cylinder number, j, since the coefficients, $\alpha$ and $\gamma$, will change depending on the value of the IMEP for each cylinder.

$$Tind_{ij}=\alpha_{ij}(IMEP_j)+\gamma_{ij} \quad (10)$$

This procedure is shown in FIG. 6.

Apparatus of the Present Invention

Figure 7:
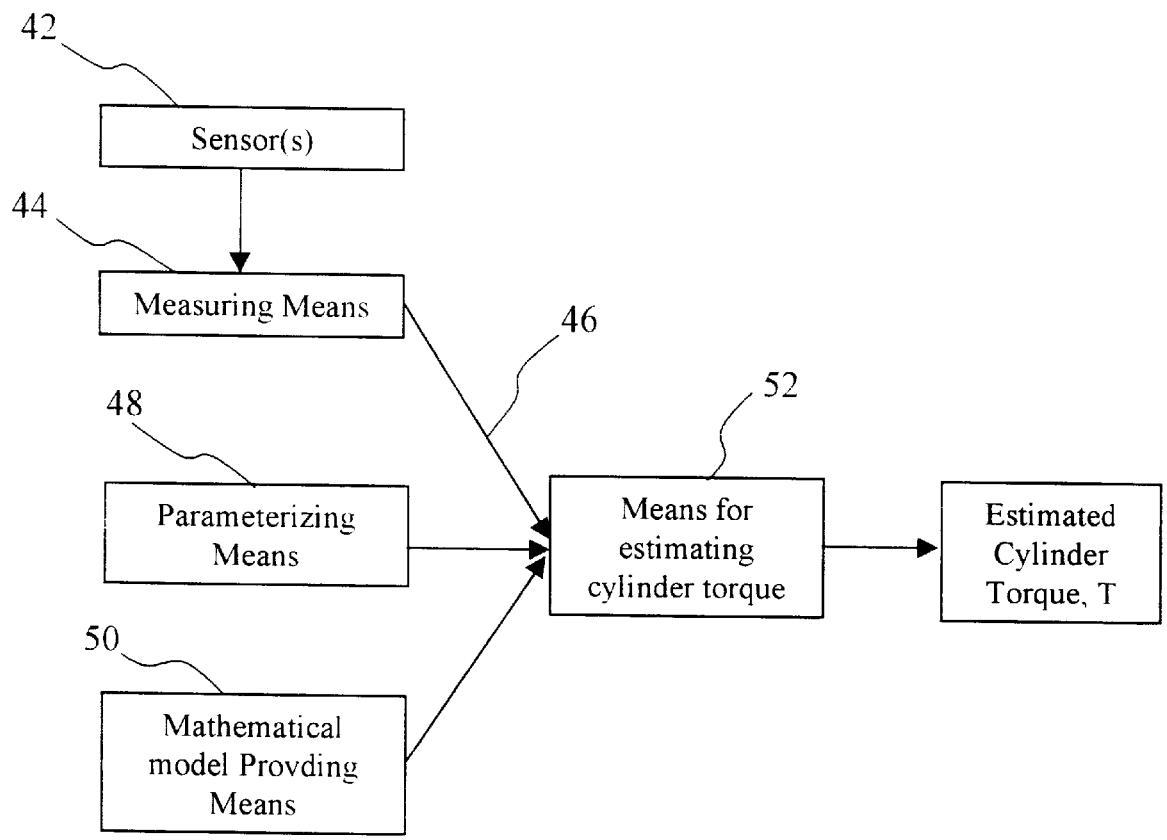
FIG. 7 is a block diagram illustrating the apparatus for practicing the method of the present invention.

Referring now to FIG. 7, the apparatus for practicing the method of the present invention is illustrated as including a set of sensors 42 for measuring the angular velocity response $\dot\theta_2$ and $\dot\theta_9$ of the crankshaft. The sensors 42 are typically variable reluctance sensors, or optical shaft encoders, although other similar sensors may be readily substituted therefor.

The signals produced by the sensors 42 are converted into a measured velocity signal 46 using the measuring means 44. The measuring means 44 utilizes at least one of several well known techniques. Such measuring means may generally be categorized into analog and digital techniques. Analog techniques typically involve using a frequency to voltage circuit which tracks the instantaneous frequency of a pulse train whose frequency is proportional to the instantaneous shaft speed. Digital methods typically involve measuring the time between zero crossings in a similar pulse train. Both methods usually require some form of low pass filtering to attenuate noise caused by tooth spacing variation and other errors. Methods to measure the angular velocity waveform of the system are well understood by those skilled in the art.

FIG. 2 shows that there is significant excitation at multiple harmonics of cycle speed. Likewise, the angular velocity response measurements $\dot\theta_2$ and $\dot\theta_9$ also contain energy at multiple harmonics. Once the angular velocity waveform is measured, the harmonic content of the waveform can be calculated by performing a Discrete Fourier Transform (DFT) on the measured signal. Alternatively, the harmonic content of the angular velocity $\dot\theta$ can be measured directly using a frequency analyzer and a trigger phased with the rotation of the shaft. Once again. these methods are well understood by those skilled in the art.

Parameterizing means 48 is provided for relating the harmonics of the applied cylinder torque T to one or more key parameters, typically IMEP. The parameterization method is explained in detail above with reference to FIGS. 2–6, and allows simultaneous consideration of multiple harmonics to reduce the rank deficiency of the overall plurality of equation sets relating the measured angular velocity $\dot\theta_2$ and $\dot\theta_9$ to the estimated cylinder torque T.

Mathematical, or lumped parameter model providing means 50, generates a model representing the angular velocity $\dot\theta$, or torsional, dynamics of the system, including boundary conditions. The model is shown schematically in FIG. 1 and permits the dynamic characteristics of the system 10 to be represented as a set of ordinary differential equations relating angular response $\dot\theta$ to torque T for each node of the system 10. These equations are then transferred to the frequency domain, where they form the frequency response functions for the system 10.

Means for estimating cylinder torque 52 utilizes the information from the measured angular velocity 46, parameterization means 48 and model providing means 50 to calculate the at least one parameter, preferably IMEP, for each cylinder torque T. Such estimating means includes means for assembling an over-determined plurality of sets of frequency domain equations, and means for solving the sets of frequency domain equations to determine the parameter IMEP. Means are also typically provided for utilizing the parameter IMEP to represent the estimated cylinder torque T.

As noted above, the measuring means 44, the parameterizing means 48, mathematical model providing means 50 and estimating means 52 may all be incorporated within computer code embedded in conventional software. Both the software and related computer hardware are well-known to those of ordinary skill in the art.

Unknown Boundary Conditions

The six cylinder engine problem described above, and shown schematically in FIG. 1 supposes that the system has known boundary conditions. In such a case, the boundary conditions are free-free boundary conditions, and known. Non-zero boundary conditions are easily accommodated when deriving the equations of motion that make up the system frequency response matrix, H.

While known boundary conditions is the standard assumption in analyses of this type, the method is generalized to include cases where one or more boundary conditions are unknown. If a boundary condition is unknown, then the boundary condition torque, Tbc, becomes an additional unknown quantity in the solution process. Equation 11 shows how the excitation torque vector, T, in Equation 4 is modified with the addition of an unknown boundary condition at the right end of the system.

$$\{T\} = \begin{Bmatrix} 0 \\ 0 \\ Tinr_{i1} + \alpha_i(IMEP_1) + \gamma_i \\ Tinr_{i2} + \alpha_i(IMEP_2) + \gamma_i \\ Tinr_{i3} + \alpha_i(IMEP_3) + \gamma_i \\ Tinr_{i4} + \alpha_i(IMEP_4) + \gamma_i \\ Tinr_{i5} + \alpha_i(IMEP_5) + \gamma_i \\ Tinr_{i6} + \alpha_i(IMEP_6) + \gamma_i \\ 0 \\ Tbc_i \end{Bmatrix} \quad (11)$$

The addition of an unknown boundary condition introduces an additional complex unknown at each frequency of interest $\omega$. Thus, the incorporation of an unknown boundary condition requires the inclusion of more frequencies $\omega$ in the solution in order to develop an over-determined equation set. Also, since a known boundary condition is a better assumption at some frequencies $\omega$ than at others, it is possible to assume the boundary condition is known at some frequencies $\omega$, and unknown at others.

Non-Cylinder Inputs

The previous section teaches how to accommodate unknown boundary conditions. Unknown boundary conditions are a special case of a general torque T that is applied to the system by an excitation source other than an engine cylinder. A general excitation source may be treated as a separate unknown as shown in Equation 11. Alternatively, if the excitation source is a known function of one or more parameters, the excitation torque T can be parameterized and integrated into the equation set in a similar way that the cylinder indicated torque Tind is parameterized. Finally, if a non-cylinder excitation torque is known, then the known excitation torque can be added to the system of equations without adding any unknowns to the overall equation set.

Number and Type of Parameters

In the illustrated examples, the harmonics of the indicated torque Tind are parameterized as a function of the indicated mean effective pressure, IMEP. The indicated to torque Tind can likewise be parameterized around parameters other than IMEP. For example, since it is straightforward to convert from IMEP to the mean indicated torque (Equation 9), the harmonics of the indicated torque Tind could easily be parameterized as a function of the mean indicated torque values Tmean ind rather than the IMEP values. In such a case, the overall plurality of equation sets would produce the mean indicated torque Tmean ind applied by each cylinder 20 directly.

The parameterization scheme can be analytically or empirically based. For example, the parameterization curves shown in FIGS. 4 and 6 could be created analytically using simulated cylinder pressure data, or the curves could be determined empirically using measured cylinder pressure data.

The same parameterization scheme need not be used for the entire solution. For example, a particular parameterization scheme may be better than others for certain ranges of IMEP, or for certain ranges of frequency $\omega$. It would be simple to implement an iterative solution procedure in which the parameterization scheme changes depending on the most recent results for the unknown parameters.

The parameterization scheme can also parameterize the harmonics of the indicated torque Tind as a function of more than one parameter. Since this adds additional unknowns to the system, addition of more input parameters requires that more frequencies $\omega$ be included in order to develop an over-determined plurality of equation sets. If the relationship between the indicated torque Tind and one or more of the parameters is non-linear, the system of equations can be linearized around a local value of each parameter using the linear terms of a multi-variable Taylor Series Expansion of the function. Once the equation sets are solved, the indicated torque Tind may be re-linearized around the updated input parameter values, and the solution can be repeated in an iterative solution process until the input parameters converge to a stable value.

Types and Number of System Response Measurements

In the illustrated examples, angular velocity measurements $\dot{\theta}_2$ and $\dot{\theta}_9$ are used as a measure of the system response. The equations can easily be written in terms of angular displacement $\theta$ or angular acceleration $\ddot{\theta}$ instead of angular velocity $\dot{\theta}$, since it is straightforward to convert between displacement, velocity, and acceleration in the frequency domain. The solution process can also accommodate a measurement of dynamic torque. The dynamic torque measured in a shaft would enable the truncation of the system model at that element, with the measured torque applied as a known boundary condition.

The addition of angular response measurement locations increases the number of independent equations in the overall equation set. Hence the more angular responses $\dot{\theta}$ are measured, the less frequencies $\omega$ are needed to form an over-determined equation set relating the measured responses to the IMEP values for each cylinder 20.

Number and Choice of Frequencies

Increasing the number of frequencies $\omega$ considered in the plurality of equation sets theoretically always increase the accuracy of the solution because the equation sets become more over-determined with each additional frequency $\omega$. However, after including an optimum number of frequencies $\omega$, the addition of more frequencies $\omega$ actually decreases the solution accuracy because of the effect of the measurement noise added with each included frequency $\omega$. The optimum number and choice of frequencies $\omega$ used in the equation set changes for each application, and is varied in each case to maximize the accuracy of the estimated IMEP values.

The equation set relating the measured angular velocities $\dot{\theta}$ to the cylinder IMEP values is over-determined by simultaneous consideration of multiple frequencies $\omega$. The minimum number of frequencies $\omega$ required to form an invertible equation set is given by Equation 12.

$$nfreq\_min = \frac{ncyl * np}{2(nmeas - nubc)} \quad (12)$$

where, nfreq_min=mininum number of frequencies ncyl=number of cylinders np=number of parameters in cylinder torque parameterization nmeas=number of angular response measurements nubc=number of unkown boundary conditions For example, in the six cylinder engine, as illustrated in FIG. 1, the number of cylinders 20 is six, the number of parameters in the torque parameterization is one (IMEP), the number of angular response measurements $\dot{\theta}$ is two (measured angular velocity $\dot{\theta}_2$ and $\dot{\theta}_9$ at the flywheel 14 and crankshaft nose 16), and the number of unknown boundary conditions is zero (known free-free boundary conditions). In this case the minimum number of frequencies $\omega$ required for a solvable equation set is 1.5.

$$nfreq\_\min = \frac{6*1}{2(2-0)} = 1.5 \qquad (13)$$

The meaning of 0.5 of a frequency $\omega$ is that only the real or imaginary part of the measured angular velocity $\dot{\theta}$ is required. Use of two or more frequencies $\omega$ in the equation set results in an over-determined equation set for the six cylinder engine shown in FIG. 1. For a sixteen cylinder engine with angular velocity measurements $\dot{\theta}$ at the front and rear of the crankshaft, and known boundary conditions, four frequencies $\omega$ are required to form a solvable equation set, and inclusion of more than four equations will result in an over-determined equation set.

System Modeling

As described above, the system model shown in FIG. 1 is an illustrative example only. In FIG. 1, an inline six cylinder engine and the connected drivetrain at the back of the engine are included in the system model. In such a case, the model represents the entire engine and drivetrain combination. The model need not include the driven mass 18 at the back of the engine, but rather can be truncated at the engine flywheel 16. Likewise, the front of the model can be reduced by simplifying the dynamic model for the crankshaft damper 12. More complicated models, including branched system models, are easily accommodated so long as the system can be described by an appropriate set of connected elements as shown in FIG. 1. The only requirement of any model used in the method is that the dynamic model for the crankshaft is sufficiently accurate to adequately describe the angular dynamics of the crankshaft.

Other Machine Types

The example illustrated above in FIG. 1 is a four stroke, six cylinder engine. Other engine types are easily accommodated with minor modifications to the method. "Vee" engines can be accommodated by applying two separate cylinder torque excitations at each crankshaft throw, or by using a separate node for each cylinder 20. Two stroke engines are handled by applying the analysis at integer harmonics of engine speed only, since the system forcing function is periodic every crankshaft revolution (versus every two revolutions for a four stroke engine). Other reciprocating machines such as reciprocating compressors can be accommodated by using an appropriately modified parameterization scheme relating the harmonics of the cylinder excitation torque to the mean indicated torque applied by the compressor cylinders.

Use of Multiple Engine Speeds

The embodiments described above utilize angular velocity data $\dot{\theta}$ taken at a single engine speed. However, the method of the present invention is not dependent on any particular engine speed or operating condition. Angular velocity data $\dot{\theta}$ can be taken at several speed and load points in the engine operating range wherein the cylinder torque T can be estimated for each operating condition. Comparison of estimation results over a variety of engine speeds and loads provides added insight into the health and performance of each engine cylinder 20.

With further reference to FIGS. 3 and 5, the methods of the present invention may include a step represented by decision block 56 for determining whether the cylinder torque T should be estimated for a different engine speed. If so, then the process returns to block 26 for activating the engine at a different determined speed. If no further analysis is requested, then the process ends at block 58.

Application of Results

The cylinder torque estimation method of the present invention has a number of useful applications including, but not limited to, real time or off-line diagnosis and identification of misfiring cylinders, active control of engine fuel systems, engine health monitoring, engine build quality assurance, engine maintenance, and diagnostic tools.

Experimental Verificaiton

Figure 8:
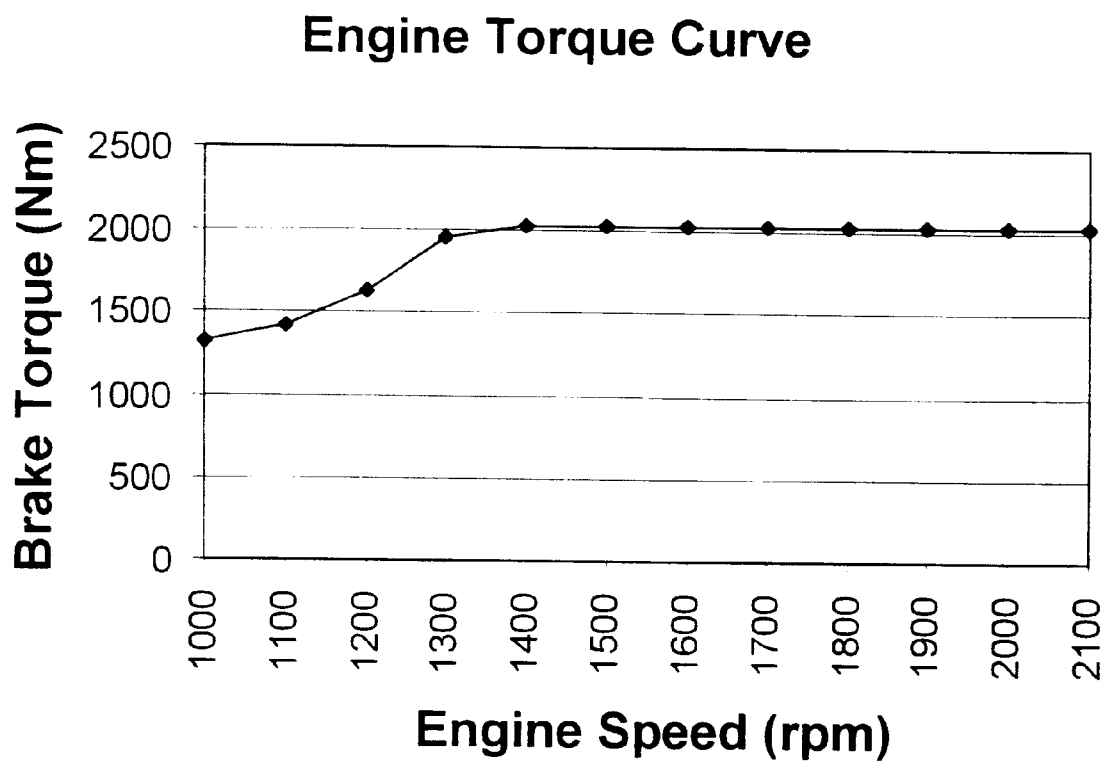
FIG. 8 is a graph illustrating an engine torque curve developed in an experimental validation test of the method and apparatus of the present invention.

The diagnostic method of the present invention has been experimentally verified using a nineteen liter, inline six-cylinder, heavy-duty diesel engine. The engine was installed in a test cell and coupled to a dynamometer with a rubber coupling and u-joint drive shaft. Crankshaft angular velocity $\dot{\theta}$ was measured at the flywheel 16 using a magnetic pickup aimed at the flywheel ring gear, and at the crankshaft nose 14 using a magnetic pickup aimed at a toothed wheel attached to the crankshaft damper hub. Cylinder number one 20a was misfired by mechanically wedging the injector crosshead in the open position. Data was taken at 100 rpm increments from 1000 rpm to 2100 rpm. The measured total engine brake torque during the test is shown in FIG. 8. Note that the engine is heavily loaded, which results in large angular deflections in the crankshaft throughout the operating range.

The cylinder torque estimation method uses the measured angular velocities $\dot{\theta}$ and a system model to calculate the indicated torque for each cylinder 20. In this case, the angular velocities $\dot{\theta}$ are provided by the measurements taken at the cranknose 14 and flywheel 16. The system model used was the existing lumped parameter model that the engine manufacturer uses for standard torsional vibration analysis. This model is similar to the model shown in FIG. 1. The cylinder torque parameterization method is a linear parameterization scheme as shown in FIGS. 3 and 4.

Figure 9:
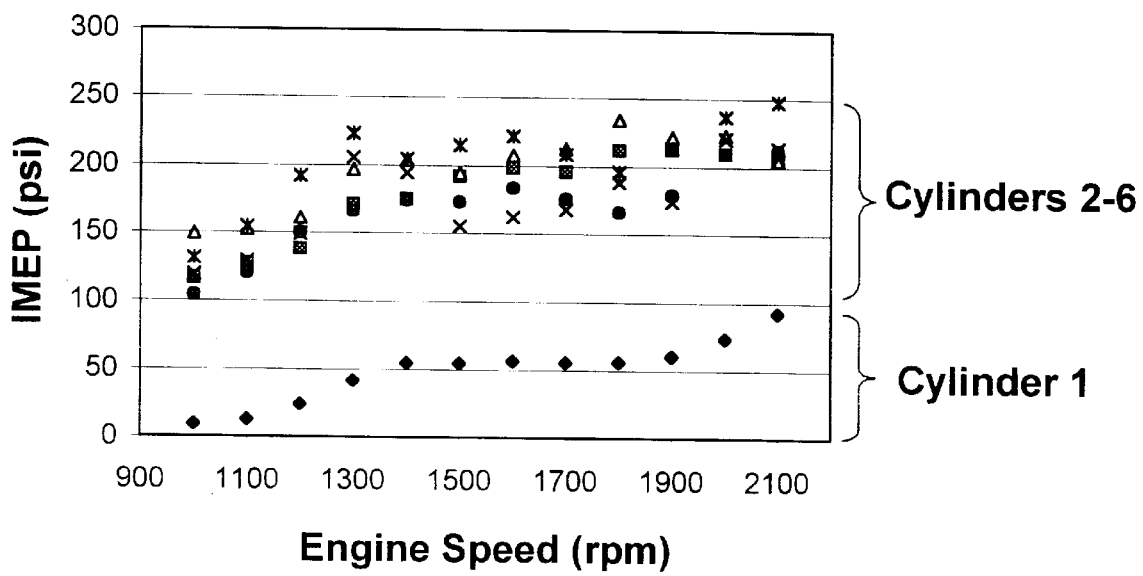
FIG. 9 is a graph illustrating indicated mean effective pressure (IMEP) estimation results for a plurality of engine speeds in the experimental validation test of FIG. 8.
Figure 10:
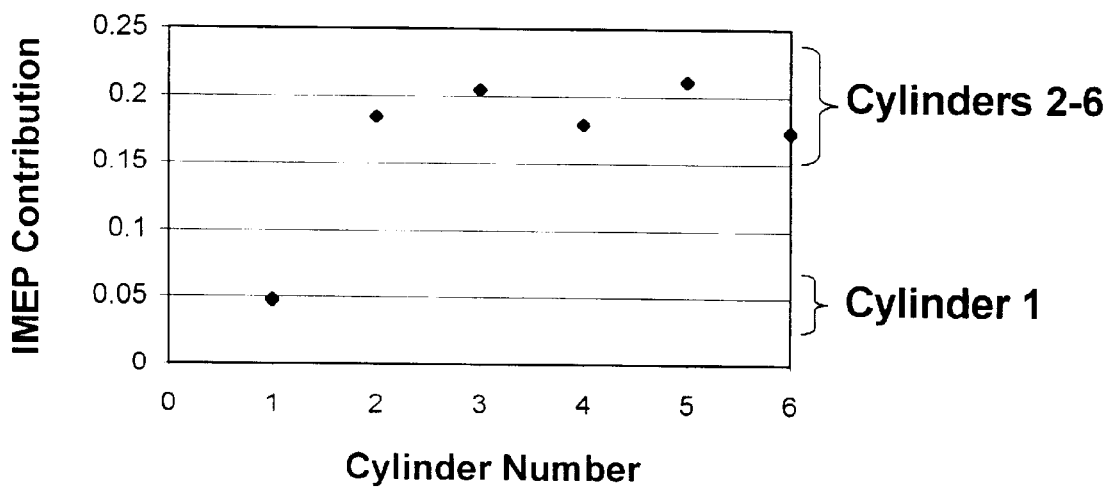
FIG. 10 is a graph illustrating indicated mean effective pressure (IMEP) estimation results averaged over the plurality of engine speeds of FIG. 9.
Figure 11:
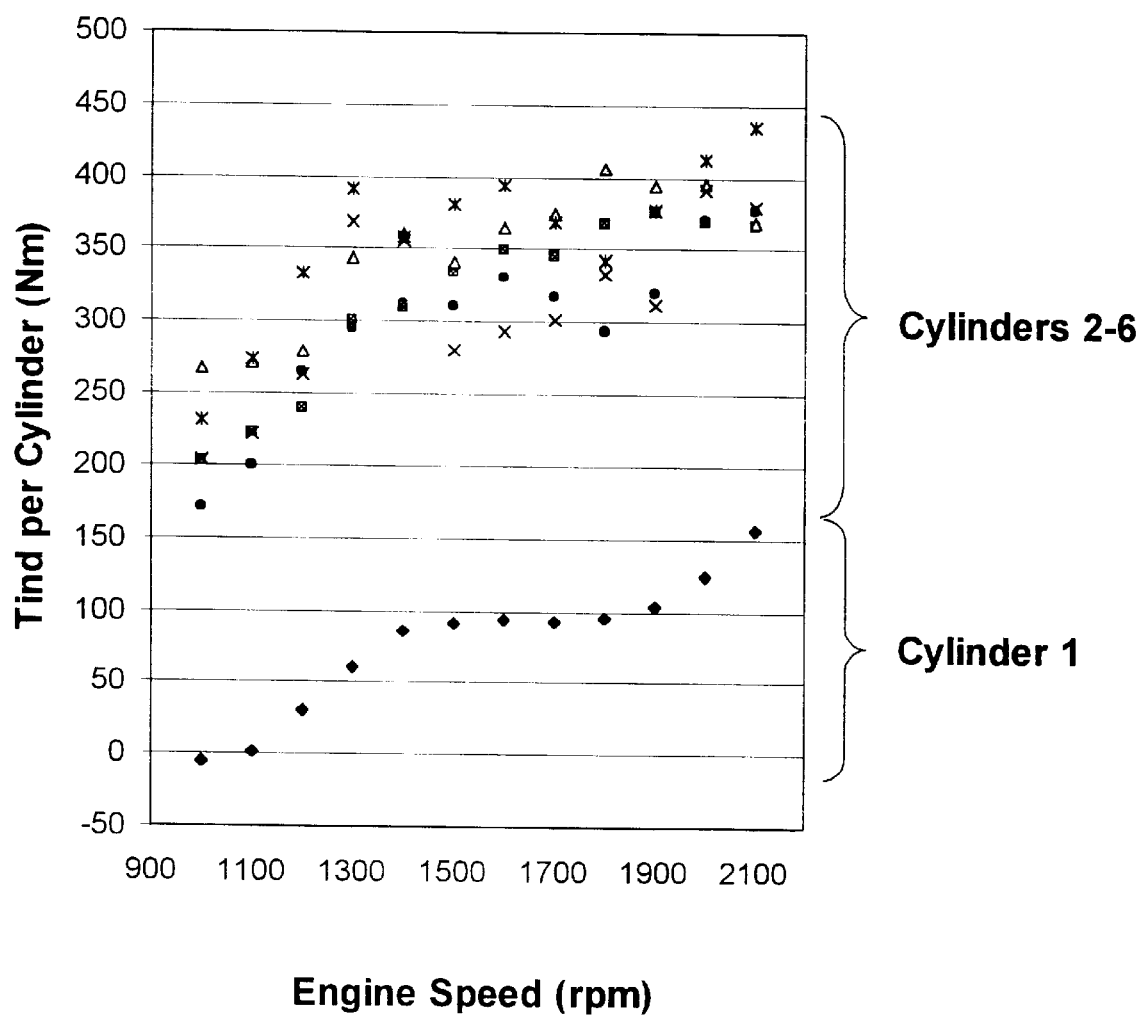
FIG. 11 is a graph illustrating the cylinder torque estimation results in the experimental validation test of FIGS. 9 and 10.

FIGS. 9 and 10 illustrate the results of the cylinder torque estimation method represented by the output of computer code used to implement the method. In FIG. 9, the estimated IMEP values are displayed for each of the six cylinders 20 and for each of the twelve engine speeds. In FIG. 10, the results are averaged over the range of engine speeds to show that the torque contribution for cylinder number one 20a is substantially less than the torque contribution for each of the other five cylinders 20b, 20c, 20d, 20e and 20f. FIG. 11 illustrates the results of the cylinder estimation process after the IMEP values have been converted to mean indicated torque values using Equation 9.

Notice that the estimated value for the indicated torque for cylinder number one 20a is slightly high, since the correct indicated torque Tind should be close to zero with the injector crosshead wedged open. The most significant reason that the estimation is high is that the indicated torque parameterization curves (illustrated in FIG. 3) used in the process were developed based on a series of non-misfiring cylinders 20.

The cylinder torque estimation process may be improved by changing the process based the results of the initial estimation results, and then rerunning the analysis. Since the estimated cylinder indicated torque Tind in cylinder number one 20a is significantly lower than the estimated indicated torque Tind in the other cylinders 20b, 20c, 20d, 20e and 20f, the estimation process could be repeated using a separate set of linear parameterization curves (see FIG. 3) for cylinder number one 20a, which are tailored to more accurately reflect the indicated torque-IMEP relationship for under-performing cylinders 20. Another option would be to use a non-linear parameterization scheme, as shown in FIG. 4, for all the cylinders 20 which would more accurately represent the indicated torque-IMEP relationship for low IMEP values, and then rerun the analysis using the iterative procedure shown in FIG. 5.

Even without utilizing any iterative procedures to refine the results, FIGS. 9–11 illustrate that cylinder number one 20a is correctly diagnosed as misfiring throughout the speed range of the engine and that the cylinder torque estimations are substantially accurate throughout the operating range. These results a significant improvement over the related prior art, since the cylinder indicated torque estimation process is substantially accurate, even though the crankshaft angular deflection is large.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A method of estimating the torque produced by each cylinder in a reciprocating machine, the method comprising the steps of:

providing a system including a reciprocating machine having a plurality of cylinders;

measuring an angular response at at least one location in said system to define a measured angular response;

creating a mathematical model representing the angular dynamics of said system, said model associating angular responses with torques at various locations in said system;

parameterizing said torques as a function of at least one parameter;

assembling a set of frequency domain equations relating said measured angular response to said at least one parameter for a selected analysis frequency;

constructing simultaneously a plurality of said sets of frequency domain equations for a plurality of said selected analysis frequencies by repeating said parameterizing and assembling steps for said plurality of selected analysis frequencies;

repeating said constructing step at least until said plurality of sets of frequency domain equations are defined as over-determined; and solving said plurality of said sets of frequency domain equations to determine said at least one parameter.

2. The method of claim 1 further comprising the step of utilizing said at least one parameter determined in said solving step to estimate said torques.

3. The method of claim 1 wherein said frequency domain equations comprise complex equations having real and imaginary parts, said assembling step further comprising the steps of:

converting said complex equations relating said at least one measured angular response to said at least one parameter into twice as many equivalent real equations; and eliminating as unknown quantities said imaginary parts of said at least one parameter in said real equations, thereby increasing the rank of said real equations.

4. The method of claim 1 wherein said step of parameterizing comprises the steps of:

separating said torque into constituent indicated torque and inertia torque; and defining said indicated torque as a linear function of said at least one parameter.

5. The method of claim 1 further comprising the step of calculating a plurality of harmonic frequencies of said torque for each said cylinder wherein said selected analysis frequencies are substantially equal to said harmonic frequencies.

6. The method of claim 1 wherein said parameterizing step comprises defining said torque for each said cylinder as a linear function of one or more parameters by locally linearizing a non-linear function for said torque around an initial estimate for said at least one parameter.

7. The method of claim 1 wherein said at least one parameter for each said cylinder comprises the indicated mean effective pressure (IMEP) for said cylinder.

8. The method of claim 1 wherein said at least one parameter for each said cylinder comprises the mean indicated torque (Tmean ind) for said cylinder.

9. A method of estimating the torque produced by each of a plurality of cylinders in a reciprocating machine, the method comprising the steps of:

providing a system including a reciprocating machine having a plurality of cylinders;

creating a mathematical model representing the angular dynamics of said system at a plurality of nodes, said model associating angular responses at said plurality of nodes with torques at said plurality of nodes, at least some of said plurality of nodes corresponding to said plurality of cylinders;

activating said reciprocating machine for causing said angular responses of said plurality of nodes;

measuring at a selected analysis frequency at least one of said angular responses at said plurality of nodes to define at least one measured angular response at said selected analysis frequency;

parameterizing said torque for each of said cylinders at said selected analysis frequency as a function of at least one parameter;

assembling a plurality of sets of frequency domain equations, each said set of frequency domain equations associating said at least one measured angular response with said at least one parameter for said plurality of cylinders at said selected analysis frequency, wherein said set of frequency domain equations is defined as over-determined; and solving said set of frequency domain equations to determine said at least one parameter for each of said plurality of cylinders.

10. The method of claim 9 further comprising the step of estimating said torque for each said cylinder utilizing said at least one parameter for each of said plurality of cylinders as determined in said solving step.

11. The method of claim 9 wherein said step of assembling said plurality of sets of frequency domain equations comprises the steps of:
choosing a different said selected analysis frequency;
repeating said measuring and parameterizing steps for said different selected analysis frequency;
comparing the number of frequency domain equations in said plurality of sets to the number of unknown quantities within said frequency domain equations; and
repeating said aforesaid steps until said number of frequency domain equations in said plurality of sets exceeds said number of unknown quantities.

12. The method of claim 9 wherein said frequency domain equations comprise complex equations having real and imaginary parts, said assembling step further comprising the steps of:
converting said complex equations relating said at least one measured angular response to said at least one parameter into twice as many equivalent real equations; and
eliminating as unknown quantities said imaginary parts of said at least one parameter in said real equations, thereby increasing the rank of said real equations.

13. The method of claim 9 wherein said step of parameterizing comprises the steps of:
separating said torque into constituent indicated torque and inertia torque; and
defining said indicated torque as a linear function of said at least one parameter.

14. The method of claim 9 further comprising the step of calculating a plurality of harmonic frequencies of said torque for each said cylinder wherein each said selected analysis frequency is substantially equal to one of said harmonic frequencies.

15. The method of claim 9 wherein said parameterizing step comprises defining said torque for each said cylinder as a linear function of one or more parameters by locally linearizing a non-linear function for said torque around an initial estimate for said at least one parameter.

16. The method of claim 9 wherein said reciprocating machine is one of an internal combustion engine and a compressor.

17. The method of claim 9 wherein said system includes a drivetrain operably connected to said machine, and said mathematical model represents the angular dynamics of said machine and drivetrain.

18. The method of claim 9 wherein unknown boundary conditions to said mathematical model are treated as additional said torques which are solved simultaneously with said at least one parameter in said plurality of sets of frequency domain equations.

19. The method of claim 9 wherein unknown torques in said system other than said torques produced by said cylinders are treated as additional unknown applied system torques which are solved simultaneously with said at least one parameter in said plurality of sets of frequency domain equations.

20. The method of claim 9 wherein unknown boundary conditions and unknown torques other than said torques produced by said cylinders are parameterized as a function of said at least one parameter and are incorporated into said set of frequency domain equations for simultaneous solution with other unknowns.

21. The method of claim 9 wherein said at least one parameter for each said cylinder comprises the indicated mean effective pressure (IMEP) for said cylinder.

22. The method of claim 9 wherein said at least one parameter for each said cylinder comprises the mean indicated torque (Tmean ind) for said cylinder.

23. The method of claim 9 further comprising the steps of:
interpreting said value of said at least one parameter resulting from said solving step;
changing said at least one parameter based upon the results of said interpreting step; and
repeating said parameterizing step.

24. A method of estimating the torque produced by a cylinder in a reciprocating machine, the method comprising the steps of:
providing a system including a reciprocating machine having a plurality of cylinders;
creating a lumped property model representing the angular dynamics of said system at a plurality of nodes, said model associating angular responses at said plurality of nodes with said torques at said plurality of nodes, at least some of said plurality of nodes corresponding to said plurality of cylinders;
measuring at a selected analysis frequency an angular response of at least one of said nodes to define at least one measured angular response at said selected analysis frequency;
parameterizing said torque for each of said cylinders at said selected analysis frequency as a linear function of at least one parameter by locally linearizing a non-linear function for said torque around an initial estimate for said at least one parameter;
assembling a plurality of sets of frequency domain equations, each said set of frequency domain equations associating said at least one measured angular response with said at least one parameter for said plurality of cylinders at said selected analysis frequency, wherein said set of frequency domain equations is defined as over-determined;
solving said set of frequency domain equations to determine said at least one parameter for each of said plurality of cylinders;
locally relinearizing said non-linear function for said torque around said at least one parameter determined from said solving step and then repeating said assembling and solving steps; and
repeating said locally relinearizing step until said at least one parameter determined from said solving step has converged to a stable solution.

25. The method of claim 24 further comprising the step of estimating said torque utilizing said at least one parameter as determined from said solving step.

26. The method of claim 24 wherein said frequency domain equations comprise complex equations having real and imaginary parts, said assembling step further comprising the steps of:
converting said complex equations relating said at least one measured angular response to said at least one parameter into twice as many equivalent real equations; and
eliminating as unknown quantities said imaginary parts of said at least one parameter in said real equations, thereby increasing the rank of said real equations.

27. The method of claim 24 wherein the key parameter for each cylinder comprises the indicated mean effective pressure (IMEP) for that cylinder.

28. The method of claim 24 wherein the key parameter for each cylinder comprises the indicated mean indicated torque (Tmean ind) for that cylinder.

29. An apparatus for estimating the torque in each cylinder of a reciprocating machine defining a system, the apparatus comprising:

a set of sensors for measuring angular response of at least one location of said system and producing an output;

means for substantially defining a measured angular response based on said output from said sensors;

means for parameterizing torque for each of the cylinders at a selected analysis frequency as a function of at least one parameter;

means for relating said measured angular response to said torque for each said cylinder at said selected analysis frequency, thereby creating a set of frequency domain equations;

means for assembling an over-determined plurality of said sets of frequency domain equations associating said at least one measured angular response with said at least one parameter for said plurality of cylinders at said selected analysis frequency; and means for solving said set of frequency domain equations to determine said at least one parameter, said estimating means including means for solving said plurality of sets of frequency domain equations for said at least one parameter.

30. The apparatus of claim 29 further comprising means for estimating said torque of each said cylinder from said at least one parameter.

31. The apparatus of claim 29 wherein said frequency domain equations comprise complex equations having real and imaginary parts, said assembling means further comprising means for converting said complex equations into twice as many equivalent real equations and means for eliminating as unknown quantities said imaginary parts of said at least one parameter in said real equations.

32. The apparatus of claim 29 wherein said at least one parameter for each said cylinder comprises the indicated mean effective pressure (IMEP) for said cylinder.

33. The apparatus of claim 29 wherein said at least one parameter for each said cylinder comprises the indicated mean torque (Tmean ind) for said cylinder.

* * * * *